(12) United States Patent
Lee

(10) Patent No.: US 7,448,716 B2
(45) Date of Patent: Nov. 11, 2008

(54) PRINTHEAD ASSEMBLY AND INKJET PRINTER WITH THE SAME

(75) Inventor: Hyeong-ill Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 328 days.

(21) Appl. No.: 11/375,194

(22) Filed: Mar. 15, 2006

(65) Prior Publication Data

US 2006/0221127 A1 Oct. 5, 2006

(30) Foreign Application Priority Data

Apr. 4, 2005 (KR) .................. 10-2005-0028079

(51) Int. Cl.
*B41J 29/393* (2006.01)
(52) U.S. Cl. .............................................. 347/19
(58) Field of Classification Search ............ 347/13, 347/42, 19; 399/18, 25, 126, 155
See application file for complete search history.

(56) References Cited

U.S. PATENT DOCUMENTS

| | | |
|---|---|---|
| 5,196,864 A | 3/1993 | Caine |
| 6,000,782 A | 12/1999 | Lee |
| 6,154,232 A | 11/2000 | Hickman et al. |
| 6,554,398 B2 * | 4/2003 | Wyngaert et al. ............. 347/42 |
| 6,582,055 B1 * | 6/2003 | Biddle et al. .................. 347/40 |
| 6,637,854 B2 * | 10/2003 | Serra et al. .................... 347/19 |

FOREIGN PATENT DOCUMENTS

| | | |
|---|---|---|
| JP | 5-193167 | 8/1993 |
| JP | 7-96645 | 4/1995 |
| JP | 2000-218891 | 8/2000 |
| KR | 10-184565 | 12/1998 |

* cited by examiner

*Primary Examiner*—Lamson D Nguyen
(74) *Attorney, Agent, or Firm*—Stein, McEwen & Bui, LLP

(57) ABSTRACT

A printhead assembly to eject ink onto an intermediate transfer medium to form an image and an inkjet printer with the same are provided. The printhead assembly has a plurality of printheads disposed around the intermediate transfer medium to eject ink thereto; a supporting body to connect the plural printheads together; a printhead reciprocating unit to reciprocate the supporting body in a major scanning direction; and a printhead adjusting unit to move the supporting body to adjust an interalignment in the major scanning direction of the plural printheads.

28 Claims, 7 Drawing Sheets

PRINTHEAD ASSEMBLY AND INKJET PRINTER WITH THE SAME

CROSS-REFERENCE TO RELATED PATENT APPLICATION

This application claims benefit under 35 U.S.C. § 119 from Korean Patent Application No. 2005-28079, filed on Apr. 4, 2005, in the Korean Intellectual Property Office, the entire content of which is incorporated herein by reference.

BACKGROUND OF THE INVENTION

1. Field of the Invention

Aspects of the present invention relate to an inkjet printer, and more particularly to a printhead assembly of an intermediate transfer type inkjet printer, and an inkjet printer with the same.

2. Description of the Related Art

Generally, inkjet printers are classified into one of two categories, either a direct ejection type or an indirect ejection type, according to the image forming method. The direct ejection type is operated so that the printhead containing ink, ejects ink directly onto paper to print an image. The indirect ejection type is operated so that the printhead ejects ink onto an intermediate transfer media to form an image, which in turn prints the formed image onto paper. The indirect ejection type inkjet printers are further classified into those using a single printhead or those using a plurality of printheads.

One significant drawback to the indirect ejection type inkjet printer using one printhead is a slow print speed due to limitations in the number of nozzles.

On the other hand, FIG. 1 is a schematic constructional diagram of a conventional indirect ejection type inkjet printer using a plurality of printheads. This printer is disclosed in U.S. Pat. No. 6,113,231. Although the plurality of printheads increases print speed, this design has its own limitations.

Referring to FIG. 1, the inkjet printer 10 includes sixteen printheads 20 installed radially around a drum 15 of an intermediate transfer medium. While the drum 15 is rotated, the plural printheads 20 eject ink one after another onto the surface of the drum 15 to form an image. The image formed on the surface of the drum 15 is transferred to paper passing between the drum 15 and a transfer roller 25, the transferred image is fused to the paper by a fuser 30, and the image printed paper is discharged outside of the inkjet printer 10.

As mentioned previously, this inkjet printer 10, has a drawback, and that is that the positions of the respective printheads 20 thereof are fixed or restrictively adjustable relative to each other and relative to the drum 15 as are the nozzles on each printhead (not shown). This drawback may allow the misalignment still within tolerance of each nozzle to constructively combine resulting in image distortion. In addition, defects generated at some of the nozzles of the respective printheads 20 may cause noticeable image defects.

SUMMARY OF THE INVENTION

Accordingly, aspects of the present invention provide a new type of printhead assembly adapted to an intermediate transfer type inkjet printer, and an inkjet printer with the same.

According to an aspect of the present invention, there is provided a printhead assembly, comprising: a plurality of printheads disposed around an intermediate transfer medium to eject ink thereto, the intermediate transfer medium to form an image by ink ejection and transfer the formed image to paper; a supporting body to connect the plural printheads together; a printhead reciprocating unit to reciprocate the supporting body in a major scanning direction; and a printhead adjusting unit to move the supporting body to adjust an interalignment of the plural printheads in the major scanning direction.

According to an aspect of the invention, the printhead assembly has two through four printheads disposed around the intermediate transfer medium.

According to an aspect of the invention, the supporting body of the printhead assembly may be pivotably connected to the respective printheads.

According to an aspect of the invention, the printhead reciprocating unit may include a rod pivotably connected to the supporting body and extended in the major scanning direction, and a reciprocating section to reciprocate the rod in the major scanning direction.

According to an aspect of the invention, the reciprocating section may include a first motor with a rotating driving gear, a connecting gear having, at its outer circumference surface, gear teeth engaged with the driving gear of the first motor and, at its inner circumference surface, an internally threaded surface, and a lead screw formed onto the rod and engaged with the internally threaded surface of the connecting gear.

According to an aspect of the invention, the printhead adjusting unit may include a stationary body fixedly coupled to the rod, and an adjusting screw geared with the stationary body with its end pivotably connected to one side of the supporting body.

According to an aspect of the invention, the adjusting screw may have a head portion with gear teeth, and the printhead adjusting unit may further include a second motor fixed to the stationary body and having a driving gear engaged with the gear teeth of the head portion.

According to another aspect of the present invention, there is provided an inkjet printer comprising an intermediate transfer medium onto which an image is formed with ink ejection and which transfers the formed image to paper; and a printhead assembly to eject ink onto the intermediate transfer medium to form the image, the printhead assembly having a plurality of printheads disposed around the intermediate transfer medium to eject ink thereto; a supporting body to connect the plural printheads together; a printhead reciprocating unit to reciprocate the supporting body in a major scanning direction; and a printhead adjusting unit to move the supporting body to adjust an interalignment in the major scanning direction of the plural printheads.

According to an aspect of the invention, the printhead assembly may have two through four printheads disposed around the intermediate transfer medium.

According to an aspect of the invention, the supporting body of the printhead assembly may be pivotably connected to the respective printheads.

According to an aspect of the invention, the printhead reciprocating unit may include a rod pivotably connected to the supporting body and extended in the major scanning direction, and a reciprocating section to reciprocate the rod in the major scanning direction.

According to an aspect of the invention, the reciprocating section may include a first motor with rotating driving gear, a connecting gear having, at its outer circumference surface, gear teeth engaged with the driving gear of the first motor and, at its inner circumference surface, an internally threaded surface, and a lead screw formed onto the rod and engaged with the internally threaded surface of the connecting gear.

According to an aspect of the invention, the printhead adjusting unit may include a stationary body fixedly coupled to the rod, and an adjusting screw geared with the stationary body with its end pivotably connected to one side of the supporting body.

According to an aspect of the invention, the adjusting screw may have a head portion with gear teeth, and the printhead adjusting unit may further include a second motor fixed to the stationary body and having a driving gear engaged with the gear teeth of the head portion.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and advantages and aspects of the present invention will become apparent and more readily appreciated from the following description of the embodiments thereof with reference to the attached drawings of which.

DETAILED DESCRIPTION OF THE EMBODIMENTS

Figure 1:
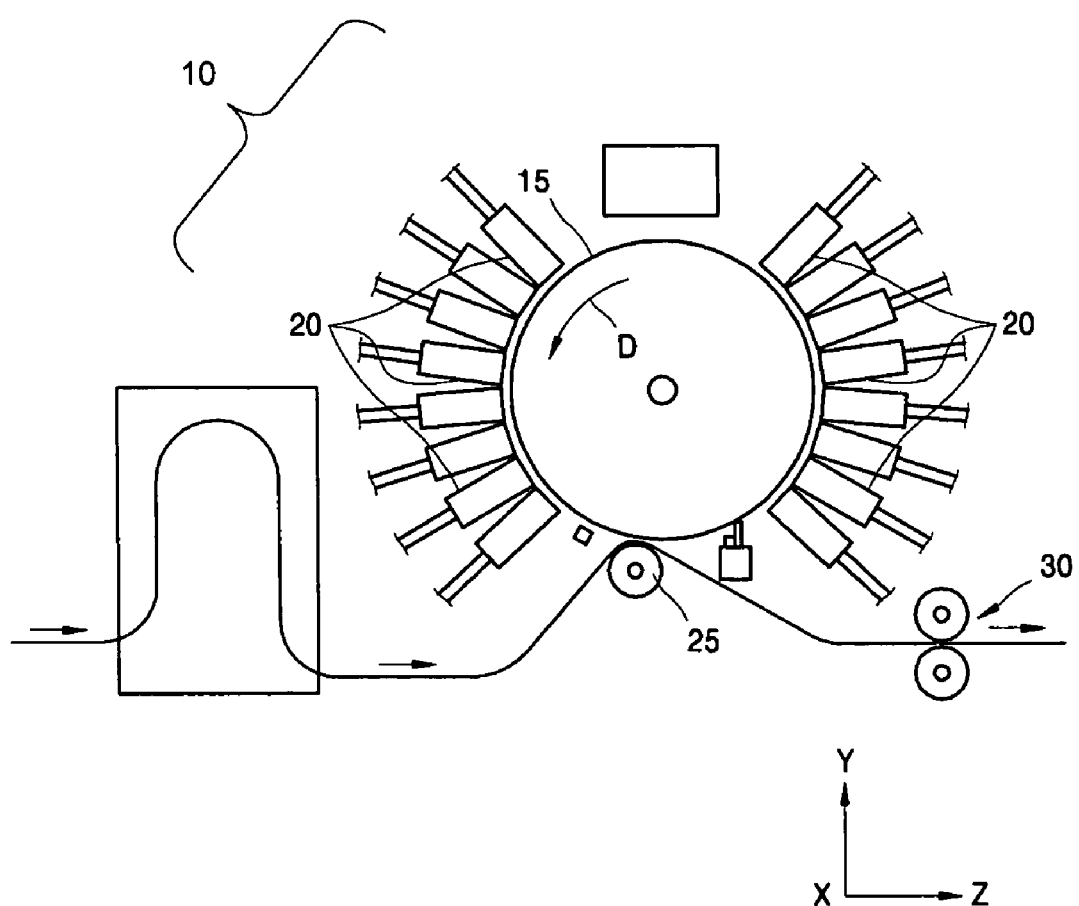
FIG. 1 is a schematic constructional diagram illustrating an example of a conventional inkjet printer.

Hereinafter, aspects of the present invention will now be described in greater detail, examples of which are illustrated in the accompanying drawings, wherein like reference numerals refer to the like elements throughout. The embodiments are described below in order to explain the present invention by referring to the figures. This invention may, however, be embodied in many different forms and should not be construed as being limited to the embodiments set forth herein. Rather, these embodiments are provided so that this disclosure will be thorough and complete, and will fully convey the scope of the invention to those skilled in the art.

Figure 2:
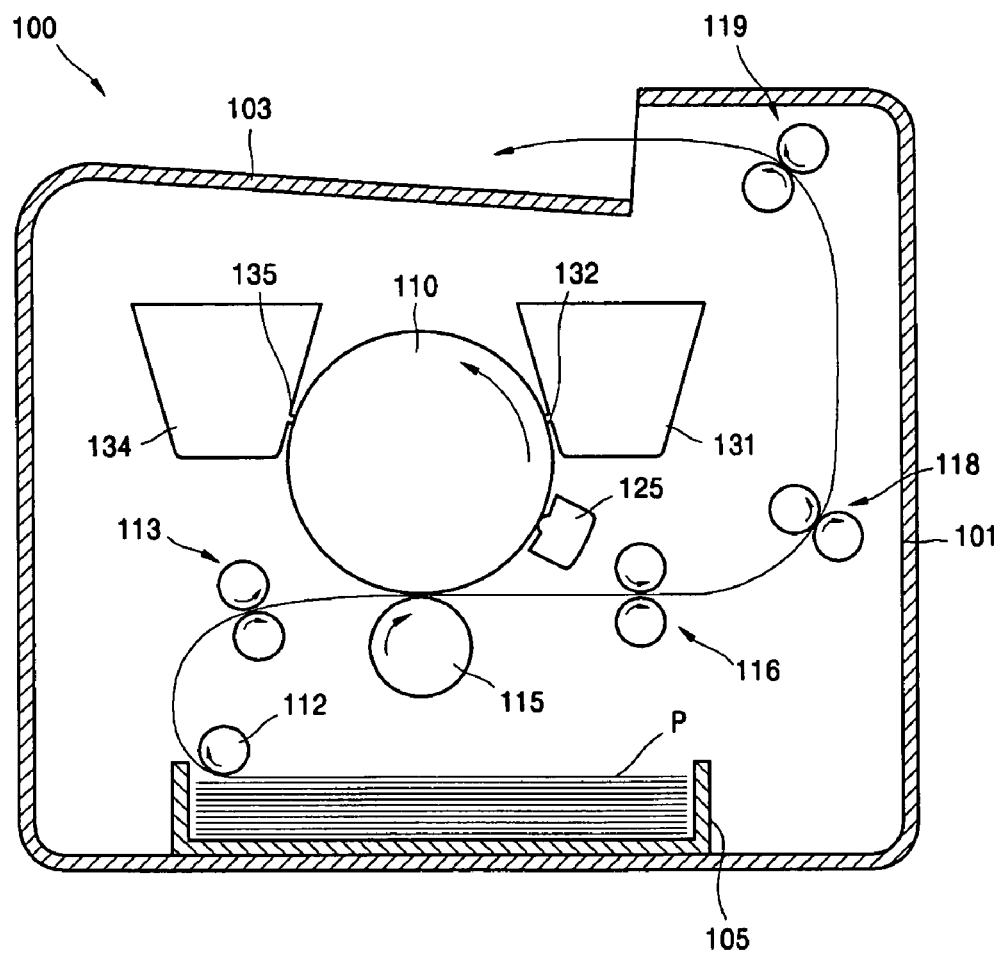
FIG. 2 is a constructional diagram illustrating an inkjet printer according to an embodiment of the present invention.

FIG. 2 is a constructional diagram illustrating an inkjet printer according to an embodiment of the present invention. Referring to FIG. 2, the inkjet printer 100 of the present invention includes an intermediate transfer medium 110 inside of an enclosure case 101, first and second printheads 131 and 134 disposed around the intermediate transfer medium 110, and a transfer roller 115. The pair of printheads 131 and 134 is a part of a printhead assembly 130 (refer to FIG. 3) as described later.

The intermediate transfer medium 110 is a cylindrical drum made from a material such as metal, on which an image is formed at its outer circumference surface with ink ejected by the first and second printheads 131 and 134. The image formed on the intermediate transfer medium 110 is transferred to paper P or other print media such as plastic transparencies for overhead projectors, passing between the transfer roller 115 and the intermediate transfer medium 110.

The first and second printheads 131 and 134 contain ink therein, and are disposed at right and left sides, respectively, around the intermediate transfer medium 110. Nozzles 132 and 135 for ink ejection are respectively formed in certain patterns at the surfaces of the printheads 131 and 134 opposite to the intermediate transfer medium 110.

The transfer roller 115 is disposed under the intermediate transfer medium 110 so as to rotate while pressing the intermediate transfer medium 110 during printing. Around the intermediate transfer medium 110, a coater 125 is disposed to apply a separation accelerator, such as silicon oil and so forth, to the outer circumference surface of the intermediate transfer medium 110. The separation accelerator is applied to the outer circumference surface of the intermediate transfer medium 110 before ink ejection to prevent transfer failure in the course of transferring the image from the intermediate transfer medium 110 to paper P.

The inkjet printer 100 includes a paper feeding tray 105 placed at a lower portion of a case 101 to stack printing papers P thereon, a paper delivery tray 103 placed at an upper portion of the case 101 to stack thereon delivered printed papers P, pick-up rollers 112 to pick up paper P stacked on the feeding tray 105 one by one, and paper feeding rollers 113 to feed picked-up paper P between the transfer roller 115 and the intermediate transfer medium 110 to transfer the image from the intermediate medium 110 to the paper P. In addition, the inkjet printer includes a fuser 116 to fix the transferred image to paper P by using heat and pressure, and first and second delivery rollers 118 and 119 to deliver to the paper delivery tray 103, paper P passed through the fuser 116.

An example of operation of the above described embodiment of the inkjet printer 100 will now be explained in detail as follows. The intermediate transfer medium 110 rotates counterclockwise onto which the separation accelerator is applied by the separation accelerator coater 125. Ink is ejected at the nozzles 132 and 135 of the first and second printheads 131 and 134, respectively, to the outer circumference surface of the intermediate transfer medium 110 thus to form an image thereto.

Meanwhile, paper P stacked in the paper feeding tray 105 is picked-up by the pick-up rollers 112, fed by the feeding rollers 113, and passed between the intermediate transfer medium 110 and the transfer roller 115. As the paper P passes between the transfer medium 110 and the transfer roller 115, the image that has been transferred to the outer circumference surface of the intermediate transfer medium 110 is transferred to the paper P on its surface facing the outer circumference surface of the intermediate transfer medium 110. The image transferred to the paper P is fused and fixed to the paper P while passing through the fuser 116. The paper to which the image is fused and fixed is then delivered by the first and second delivery rollers 118 and 119, thereby being stacked on the paper delivery tray 103.

Figure 3:
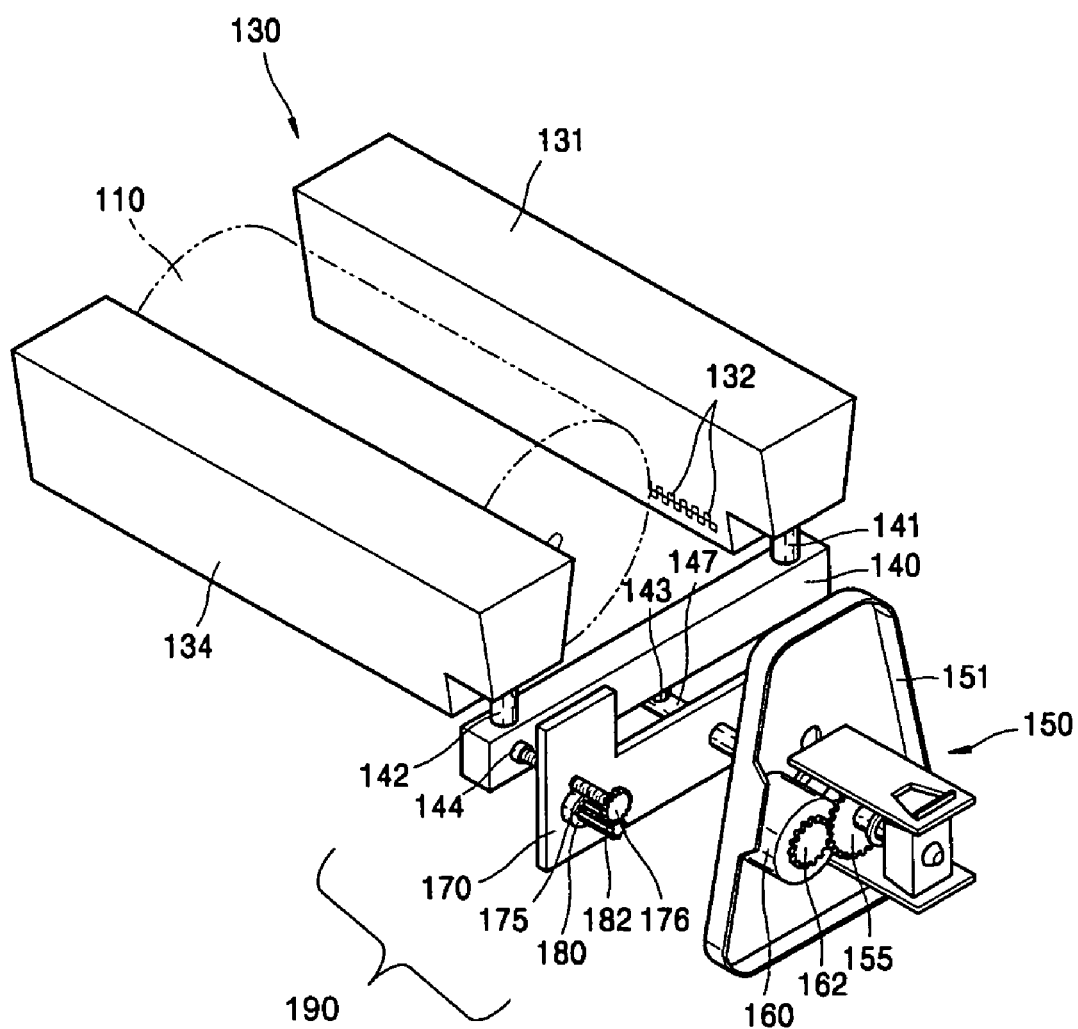
FIG. 3 is a perspective view illustrating a printhead assembly included in a configuration of FIG. 2.
Figure 4:
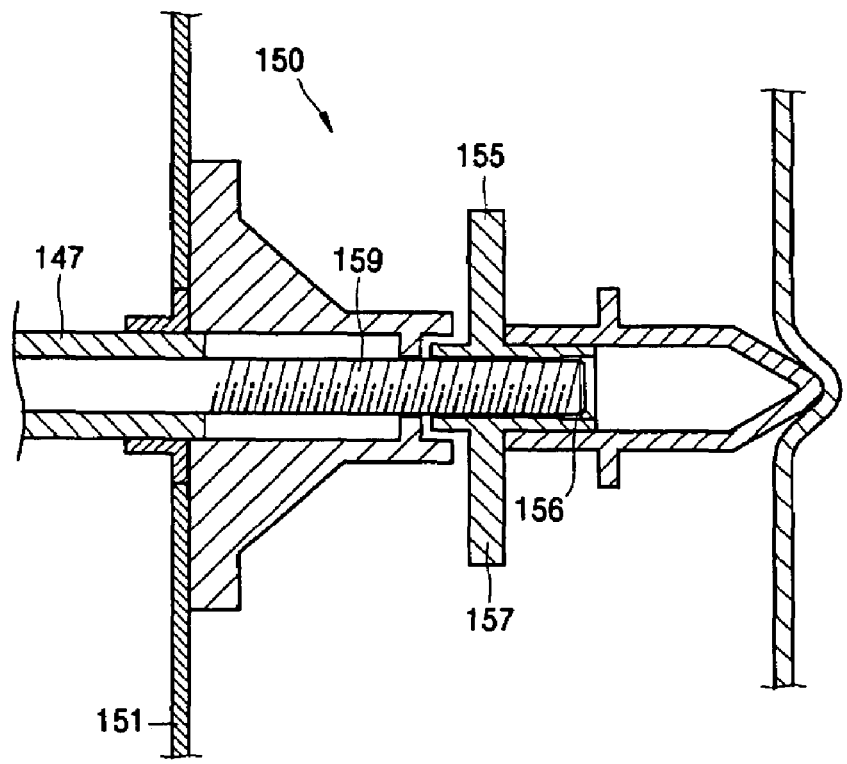
FIG. 4 is a sectional view illustrating a printhead reciprocating unit depicted in FIG. 3.
Figure 5:
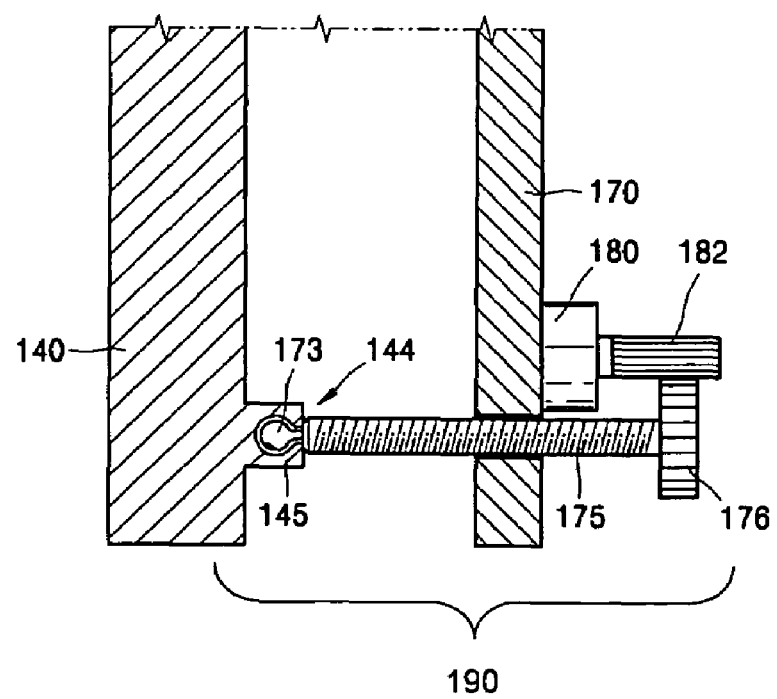
FIG. 5 is a sectional view illustrating a printhead adjusting unit depicted in FIG. 3.
Figure 6:
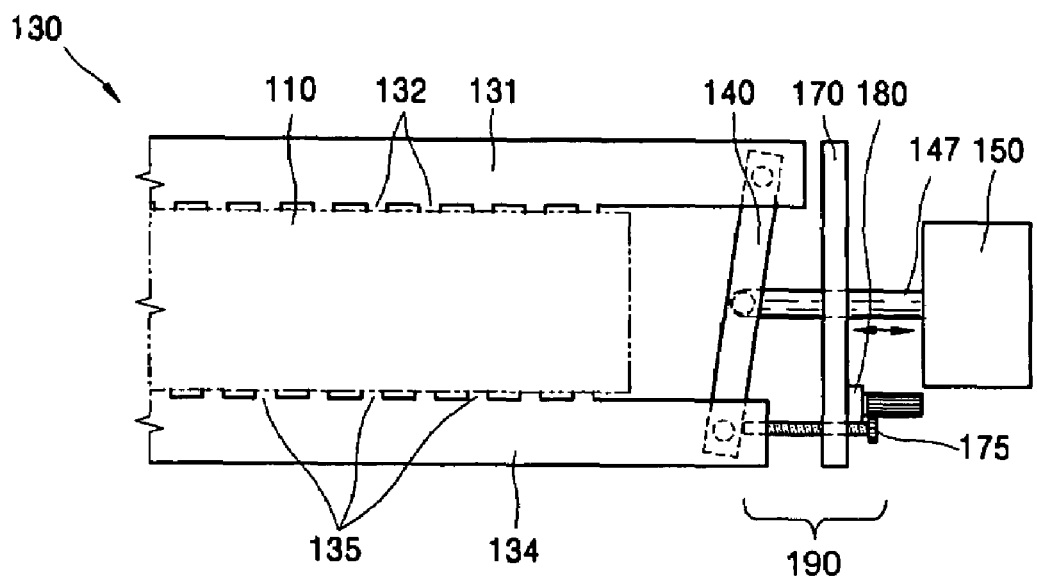
FIGS. 6 and 7 are schematic diagrams for explaining an operation of the printhead assembly of FIG. 2.
Figure 7:
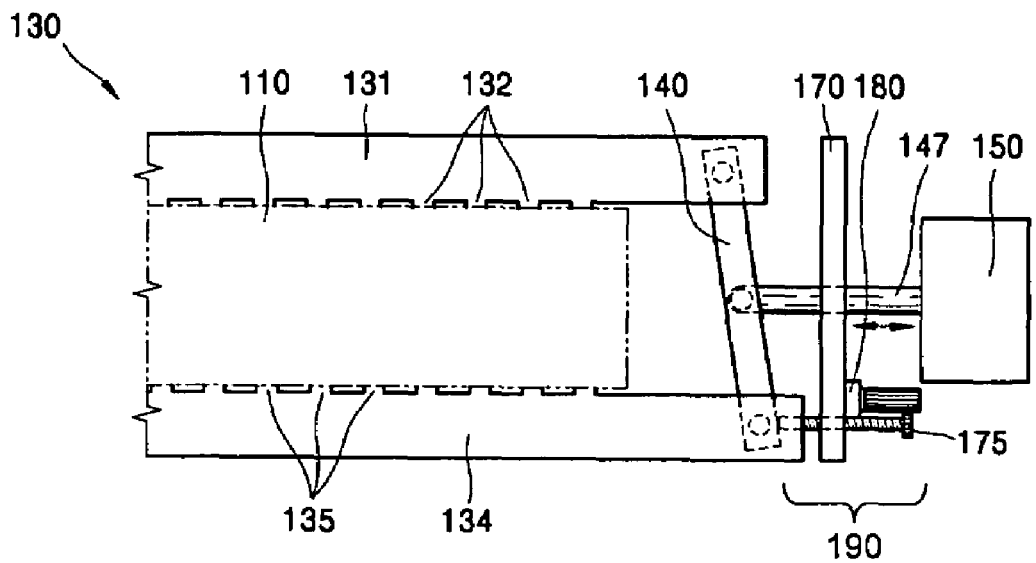
Figure 8:
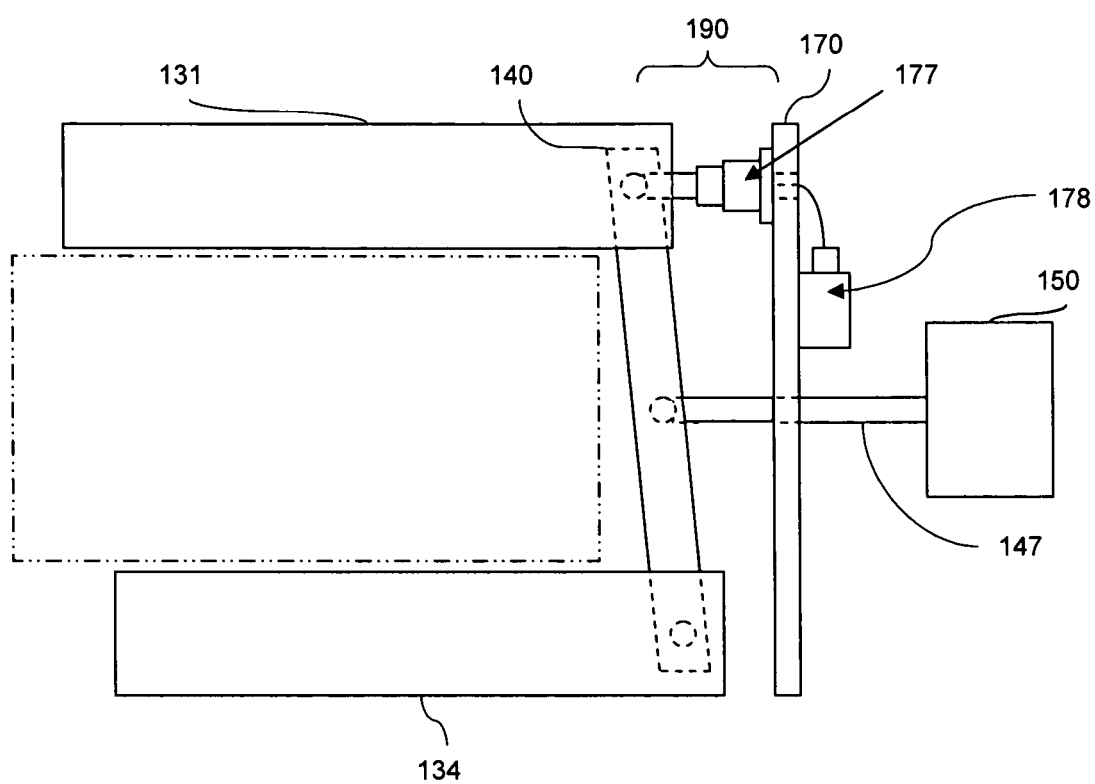
FIGS. 8 and 9 are schematic diagrams for explaining an operation of the printhead assembly of FIG. 2 using additional embodiments of the present invention.
Figure 9:
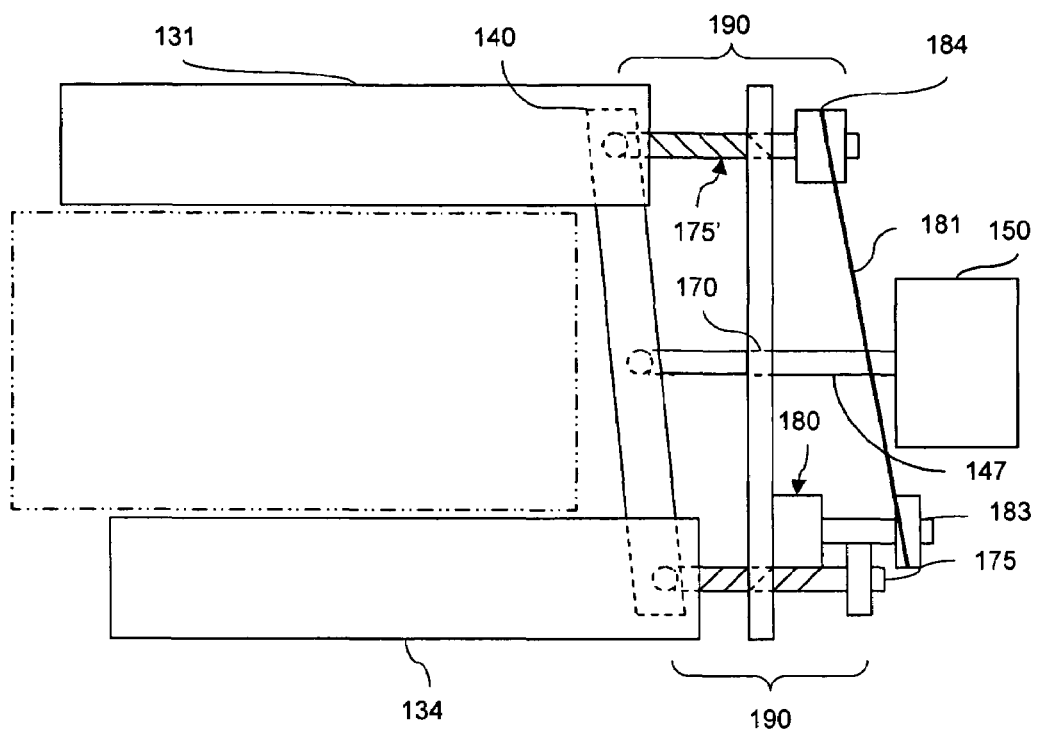

FIG. 3 is a perspective view illustrating a printhead assembly included in a configuration of FIG. 2. FIG. 4 is a sectional view illustrating a printhead reciprocating unit depicted in FIG. 3. FIG. 5 is a sectional view illustrating a printhead adjusting unit depicted in FIG. 3. FIGS. 6 and 7 are schematic diagrams for explaining an operation of the printhead assembly of FIG. 2. FIGS. 8 and 9 are schematic diagrams for explaining an operation of the printhead assembly of FIG. 2 using additional embodiments of the invention.

Referring to FIG. 3, the printhead assembly 130 includes first and second printheads 131 and 134 disposed around the intermediate transfer medium 110, a supporting body 140 connecting the pair of printheads 131 and 134 together, a printhead reciprocating unit for reciprocating the supporting body 140 in a major scanning direction, i.e., a lengthwise direction of the intermediate transfer medium 110, and a printhead adjusting unit 190 for adjusting an interalignment in the major scanning direction of the pair of printheads 131 and 134.

The supporting body 140 is pivotably connected with the first printhead 131 through a first printhead connector 141, and also pivotably connected with the second printhead 134 through a second printhead connector 142. The connectors 141 and 142 may be configured to comprise a pin capable of coupling the printheads 131 and 134 and the supporting body 140 rotatably to each other within a certain angle range. Such elements of the connectors 141 and 142 are known to those skilled in the art, so that the detailed description thereof will be omitted.

The printhead reciprocating unit is pivotably connected with the supporting body 140, and has a rod 147 extended in the major scanning direction and a reciprocating section 150 for reciprocating the rod 147 in the major scanning direction. A rod connector 143 connecting the rod 147 with the supporting body 140 may comprise the same configuration as the first printhead connector 141 or the second printhead connector 142, so its detailed description will be omitted as well.

Referring to FIGS. 3 and 4, the reciprocating section 150 includes a frame 151 fixed to the inside of the case 101 (see FIG. 2), a lead screw 159 extending along the inside of the rod 147 and running through the frame 151, a connecting gear 155 having an internally threaded surface engaged with a threaded surface of the lead screw 159 at its inner circumference surface 156 and gear teeth at its outer circumference surface 157, and a first motor 160 fixed to the frame 151. The first motor 160 has a rotating driving gear 162. When the driving gear 162 rotates, the connecting gear 155 engaged with the driving gear 162 is rotated so that the lead screw 159 engaged with the inner circumference surface 156 of the connecting gear 155 is moved in the major scanning direction, i.e., its lengthwise direction. The rod 147 extended from the lead screw 159 is accordingly moved in the major scanning direction thus to move the supporting body 140 and the printheads 131 and 134 connected thereto in the major scanning direction.

Referring to FIGS. 3 and 5, the printhead adjusting unit 190 includes a stationary body 170 fixed to the rod 147, and an adjusting screw 175 with its one end pivotably connected to one side of the supporting body 140 through an adjusting screw connector 144. The adjusting screw connector 144 has a ball 173 formed at a terminal end of the adjusting screw 175, and a holder 145 formed at one side of the supporting body 140. The holder 145 surrounds and holds the ball 173 to prevent the disconnection of the adjusting screw 175 from the supporting body 140, and to enable the rotation of the adjusting screw relative to the supporting body 140. The stationary body 170 has an internally threaded surface in conformity with the threaded surface formed to the adjusting screw 175, so that when the adjusting screw 175 rotates, one side of the supporting body 140 is pushed or pulled in the major scanning direction, thereby allowing the supporting body 140 to be rotated at a certain angle about the rod connector 143. Thus, when the second printhead 134 coupled to one side of the supporting body 140 is pushed in the major scanning direction, the first printhead 131 coupled to the other side of the supporting body 140 is contrariwise pulled in the major scanning direction (see FIG. 6). On the contrary, when the second printhead 134 is pulled in the major scanning direction, the first printhead 131 is contrariwise pushed in the major scanning direction (see FIG. 7).

While the printhead adjusting unit 190 is described as having an adjusting screw 175 with its one end pivotably connected to one side of the supporting body 140 through an adjusting screw connector 144, in the shown example, it is understood that the connecting screw 175 may be a piston 177, piezo-electric device (not shown), or other connection capable of expanding and contracting with precision. That is, referring to FIG. 8, a piston 177 with one end connected to one side of the supporting body 140 and the other end connected to the stationary body 170 can be used to adjust the distance between one side of the supporting body 140 and that side of the stationary body 170 to move the printheads 131 and 134 in the major scanning direction. The piston 177 can be precisely adjusted using a compressor and valve unit 178 mounted on the stationary body 170.

Similarly, it is understood that the printhead adjusting unit 190 can comprise a second adjusting screw 175' with its one end pivotably connected to the opposite side of the supporting body 140 through a corresponding second adjusting screw connector as shown in FIG. 9. This second adjusting screw can add stability to the printhead adjusting unit 190.

The second adjusting screw 175' can be coordinated to advance simultaneously with the first adjusting screw 175 but in the opposite direction by a number of ways. For example, if the second adjusting screw 175' has opposite screw threads, i.e., left-handed threads as opposed to right-handed screw threads, and is turned in the same direction as the first adjusting screw 175, it will advance in the opposite direction. On the other hand, the adjusting screws 175 and 175' can turn in opposite directions to advance in opposite directions along the major scanning axis if both screws are the same handedness. In other words, the adjusting screws 175 and 175' are coordinated so that when the first adjusting screw 175 is turned to pull the first printhead 131 in the major scanning direction, the second adjusting screw 175' is turned simultaneously to contrariwise push the second printhead 134 in the major scanning direction.

The adjusting screw 175 has a head portion 176 that forms gear teeth. A second motor 180 is installed to the stationary body 170, and has a driving gear 182 engaged with the head portion 176. As for the second motor 180, a stepping motor may be used that enables the driving gear 182 to be rotated in clockwise and counterclockwise directions, and allows precise control of angle of rotation.

In the present embodiment, the driving gear 182 meshes with the gear teeth on the head portion 176 to rotate the adjusting screw 175, but the present invention is not limited thereto. That is, the driving gear 182 may engage the adjusting screw head portion 176 through a pulley and belt system or gear and chain system or other drive system that is known to one of skill in the art that enables the adjusting screw 175 to be rotated in clockwise and counterclockwise directions with precise control of angle of rotation. Similarly, the driving gear 182 may simultaneously engage the adjusting screw head portion of the second adjusting screw 175' either directly or through a pulley and belt system or gear and chain system or other drive system that is known to one of skill in the art that enables the second adjusting screw 175' to be rotated in the opposite direction to the first adjusting screw 175 with precise control of angle of rotation. FIG. 9 shows an embodiment of the invention, where the second adjusting screw 175' is coupled to the second motor 180 through a belt 181 and pulleys 183 and 184 to rotate the adjusting screws 175 and 175' simultaneously.

Referring to FIGS. 6 and 7, when a print order is inputted to the inkjet printer 100 (see FIG. 2), the rod 147, the supporting body 140, and the pair of printheads 131 and 134 are reciprocated in the major scanning direction by the reciprocating section 150 to form a line image onto the intermediate transfer medium 110 by an interlace way. The interlace way allows normal nozzles adjacent to imperfect nozzles to eject ink instead of the imperfect nozzles as the printhead moves in the major scanning direction. In addition, when the intermediate transfer medium 110 is rotated, line images are put therebetween with the interleave way thus to form a complete image. Since the image is formed on the intermediate transfer medium 110 by the interlace way, even though a defect is generated at a part of the nozzles 132 and 135 of the printheads 131 and 134, the image defect therefrom does not become significant to the extent of being noticeable.

Although the current embodiment describes the interleave printing process using one pair of printheads, the present invention is not limited thereto. That is, more than one pair of printheads can print in the interleave way. For one pair of printheads to print an image, the first printhead of the pair prints the (2n−1) line images (i.e., $1^{st}$, $3^{rd}$, $5^{th}$, etc.), and the second printhead of the pair prints the (2n) line images (i.e., $2^{nd}$, $4^{th}$, $6^{th}$, etc.), where n goes from 1 to ½ of the total number of lines in an image. Similarly, for two pairs of printheads to print an image, the first printhead of the first pair prints the (4n−3) line images (i.e., $1^{st}$, $5^{th}$, $9^{th}$, etc.), the first printhead of the second pair prints the (4n−2) line images (i.e., $2^{nd}$, $6^{th}$, $10^{th}$, etc.), the second printhead of the first pair prints the (4n−1) line images, and the second printhead of the second pair of printheads prints the (4n) line images, where n goes from 1 to ¼ of the total number of lines in the image.

Before printing is initiated, print setting parameters can be adjusted by use of the printhead assembly 130 and the printhead adjusting unit 190. That is, the position of the pair of printheads 131 and 134 can be changed relative to each other along the major scanning direction, through the control of the second motor 180 to change the print setting and achieve a desired print resolution or interlace ratio. Such a change of relative position between the pair of printheads 131 and 134 makes it possible to reduce or prevent an image distortion otherwise generated due to the constructive combination of the position tolerances of the nozzles 132 and 135 of the printheads 131 and 134.

The printhead assembly and the inkjet printer with the same according to an aspect of the present invention have the following immediately recognized beneficial effects.

First, by using multiple printheads, the printing speed is faster than that of an inkjet printer employing a single printhead.

Second, by adjusting the relative position of the plural printheads, the printing settings such as printing resolution can be changed easily and freely, and any image distortion due to the cumulative position tolerances between the printheads can be reduced or eliminated.

Finally, by forming the image using the interlace way even while employing the plural printheads, image defects due to imperfections in a part of the nozzles can be reduced or prevented.

The foregoing embodiments, aspects and advantages are merely exemplary and are not to be construed as limiting the present invention, the scope of which is defined in the claims and their equivalents. For example, according to another embodiment of the present invention, the printhead assembly may have 3 or 4 printheads. The present teaching can be readily applied to other types of apparatuses. Also, the description of the embodiments of the present invention is intended to be illustrative, and not to limit the scope of the claims or equivalents thereof, and many alternatives, modifications, and variations will be apparent to those skilled in the art. Various changes and details may be made therein without departing from the spirit and scope of the present invention as defined by the following claims.

What is claimed is:

1. A printhead assembly, comprising:
   a plurality of printheads disposed around an intermediate transfer medium to eject ink thereto, the intermediate transfer medium forming an image with ink ejection and transferring the formed image to a print medium;
   a supporting body to connect the plural printheads together;
   a printhead reciprocating unit to reciprocate the supporting body in a major scanning direction of the print medium; and
   a printhead adjusting unit to move the supporting body to adjust an interalignment of the plural printheads in the major scanning direction.

2. The printhead assembly according to claim 1, wherein the plurality of printheads comprise one to two pairs of printheads around the intermediate transfer medium.

3. The printhead assembly according to claim 1, wherein the supporting body is pivotably connected to the printheads.

4. The printhead assembly according to claim 3, wherein the pivotable connector comprises a pin to couple the supporting body rotatably to the printhead within a certain angle range.

5. The printhead assembly according to claim 3, wherein the printheads are symmetrically located on opposite ends of the supporting body.

6. The printhead assembly according to claim 1, wherein the printhead reciprocating unit comprises:
   a rod pivotably connected to the supporting body and extended in the major scanning direction of the print medium; and
   a reciprocating section to reciprocate the rod in the major scanning direction.

7. The printhead assembly according to claim 6, wherein the reciprocating section comprises:
   a first motor with a rotating driving gear:
   a connecting gear having, at an outer circumference surface, gear teeth engaged with the driving gear of the first motor and, at an inner circumference surface, an internally threaded surface; and
   a lead screw formed onto the rod and engaged with the internally threaded surface of the connecting gear.

8. The printhead assembly according to claim 6, wherein the printhead adjusting unit comprises:
   a stationary body fixedly coupled to the rod; and
   a first adjusting screw geared with the stationary body with one end pivotably connected to one side of the supporting body.

9. The printhead assembly according to claim 8, wherein:
   the first adjusting screw comprises a ball formed at a terminal end and
   the supporting body comprises a holder that surrounds and holds the ball formed at the terminal end of the first connecting screw.

10. The printhead assembly according to claim 8, wherein the printhead adjusting unit comprises a second adjusting screw on the other side of the stationary body from the first adjusting screw, geared with the stationary body with one end pivotably connected to the other side of the supporting body from first adjusting screw.

11. The printhead assembly according to claim 8, wherein the first adjusting screw has a head portion, and the printhead adjusting unit further includes a second motor fixed to the stationary body and having a driving wheel engaged with the head portion to advance the first adjusting screw.

12. The printhead assembly according to claim 8, wherein the first adjusting screw has a head portion with gear teeth, and the printhead adjusting unit further includes a second motor fixed to the stationary body and having a driving gear engaged with the gear teeth of the head portion.

13. The printhead assembly according to claim 10, wherein the second adjusting screw has a head portion engaged with the second motor to advance the second adjusting screw simultaneously with the first adjusting screw in an opposite direction to the first adjusting screw.

14. The printhead assembly according to claim 10, wherein the second adjusting screw has a head portion with gear teeth engaged with the second motor fixed to the stationary body to turn the second adjusting screw simultaneously with the first adjusting screw to advance the second screw in an opposite direction to the first adjusting screw.

15. An inkjet printer, comprising:
an intermediate transfer medium onto which an image is formed with ink ejection and which transfers the formed image to print medium; and
a printhead assembly to eject ink onto the intermediate transfer medium to form the image,
wherein the printhead assembly comprising:
a plurality of printheads disposed around the intermediate transfer medium to eject the ink thereto,
a supporting body to connect the plural printheads together,
a printhead reciprocating unit to reciprocate the supporting body in a major scanning direction of the print medium, and
a printhead adjusting unit to move the supporting body to adjust an interalignment of the plural printheads in the major scanning direction.

16. The inkjet printer according to claim 15, wherein the plurality of printheads comprise one to two pairs of printheads around the intermediate transfer medium.

17. The inkjet printer according to claim 15, wherein the supporting body is pivotably connected to the printheads.

18. The inkjet printer according to claim 15, wherein the pivotable connector comprises a pin to couple the supporting body rotatably to the printhead within a certain angle range.

19. The inkjet printer according to claim 15, wherein the printheads are symmetrically located on opposite ends of the supporting body.

20. The inkjet printer according to claim 15, wherein the printhead reciprocating unit comprises:
a rod pivotably connected with the supporting body and extended in the major scanning direction of the print medium; and
a reciprocating section to reciprocate the rod in the major scanning direction.

21. The inkjet printer according to claim 20, wherein the reciprocating section comprises
a first motor with a rotating driving gear;
a connecting gear having, at an outer circumference surface, gear teeth engaged with the driving gear of the first motor and, at an inner circumference surface, an internally threaded surface; and
a lead screw formed onto the rod and engaged with the internally threaded surface of the connecting gear.

22. The inkjet printer according to claim 20, wherein the printhead adjusting unit comprises a stationary body fixedly coupled to the rod, and a first adjusting screw geared with the stationary body with one end pivotably connected to one side of the supporting body.

23. The inkjet printer according to claim 22, wherein:
the first adjusting screw comprises a ball formed at a terminal end and
the supporting body comprises a holder that surrounds and holds the ball formed at the terminal end of the first connecting screw.

24. The inkjet printer according to claim 22, wherein the printhead adjusting unit includes a second adjusting screw on the other side of the stationary body from the first adjusting screw, geared with the stationary body with one end pivotably connected to the other side of the supporting body from the first adjusting screw.

25. The inkjet printer according to claim 22, wherein the first adjusting screw has a head portion, and the printhead adjusting unit further includes a second motor fixed to the stationary body and having a driving wheel engaged with the head portion to advance the first adjusting screw.

26. The inkjet printer according to claim 22, wherein the first adjusting screw has a head portion with gear teeth, and the printhead adjusting unit further includes a second motor fixed to the stationary body and having a driving gear engaged with the gear teeth of the head portion.

27. The inkjet printer according to claim 25, wherein the second adjusting screw has a head portion engaged with the second motor to advance the second adjusting screw simultaneously with the first adjusting screw in an opposite direction to the first adjusting screw.

28. The inkjet printer according to claim 25, wherein the second adjusting screw has a head portion with gear teeth engaged with the second motor fixed to the stationary body to turn the second adjusting screw simultaneously with the first adjusting screw to advance the second screw in an opposite direction to the first adjusting screw.

* * * * *